United States Patent
Herman et al.

(10) Patent No.: US 11,668,804 B2
(45) Date of Patent: Jun. 6, 2023

(54) VEHICLE SENSOR-CLEANING SYSTEM

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1048 days.

(21) Appl. No.: 16/268,621

(22) Filed: Feb. 6, 2019

(65) Prior Publication Data

US 2020/0249329 A1    Aug. 6, 2020

(51) Int. Cl.
*G01S 7/497* (2006.01)
*G01S 17/931* (2020.01)

(52) U.S. Cl.
CPC .............. *G01S 7/497* (2013.01); *G01S 17/931* (2020.01); *G01S 2007/4977* (2013.01)

(58) Field of Classification Search
CPC .......... B60S 1/0848; B60S 1/481; B60S 1/52; B60S 1/528; B60S 1/56; B60S 1/603
See application file for complete search history.

(56) References Cited

U.S. PATENT DOCUMENTS

| 6,189,808 | B1* | 2/2001 | Daniels .................. B60S 1/485 |
| | | | 15/250.002 |
| 6,940,554 | B2 | 9/2005 | Robins et al. |
| 9,217,864 | B2 | 12/2015 | Bell et al. |
| 10,011,226 | B2 | 7/2018 | Stein et al. |
| 10,089,540 | B2 | 10/2018 | May et al. |
| 2016/0291156 | A1* | 10/2016 | Hjelmstad .............. G01S 17/86 |
| 2018/0143298 | A1* | 5/2018 | Newman ............ G01C 21/3484 |
| 2018/0319376 | A1 | 11/2018 | Dusina et al. |
| 2018/0339681 | A1* | 11/2018 | Salter .................. B60Q 11/005 |
| 2019/0135239 | A1* | 5/2019 | Rice ......................... B60S 1/52 |
| 2019/0361100 | A1* | 11/2019 | Abari ..................... G01S 7/497 |
| 2020/0033250 | A1* | 1/2020 | Van Der Sluis ... G01N 15/1425 |
| 2021/0179030 | A1* | 6/2021 | Sakai ..................... B60S 1/528 |

FOREIGN PATENT DOCUMENTS

DE     102015117612 A1    4/2017

OTHER PUBLICATIONS

"LED Source Selection Guide", Mightex Systems, https://www.mightexsystems.com/family_info.php? cPath=227&categories_id=227.

(Continued)

*Primary Examiner* — Timothy X Pham
(74) *Attorney, Agent, or Firm* — Frank A. MacKenzie; Bejin Bieneman PLC (57) ABSTRACT

A system includes a sensor including a window; at least three lamps positioned to illuminate the window and be able to generate different ranges of wavelengths than one another; a cleaning component positioned to clean the window; and a computer communicatively coupled to the sensor, the lamps, and the cleaning component. The computer is programmed to activate the lamps and actuate the cleaning component based on data generated by the sensor during the activations of the lamps.

19 Claims, 7 Drawing Sheets

(56) References Cited

OTHER PUBLICATIONS

Marx et al., "Application of NIR-lasers for the control of aphids and whiteflies", DGG-Proceedings, vol. 3, Dec. 2013, Mo. 12, DOI: 10.5288/dgg-pr-03-12-cm-2013.
Pang et al., "Extracting Valley-Ridge Lines from Point-Cloud-Based 3D Fingerprint Models", IEEE Computer Society, Jul./Aug. 2013.
Petty, "A First Course in Atmospheric Radiation", Sundog Publishing LLC, https://sundogpublishingstore.myshopify.com/products/a-first-course-in-atmospheric-radiation-g-w-petty.
Sison-Mangus et al., "Beauty in the eye of the beholder: the two blue opsins of lycaenid butterflies and the opsin gene-driven evolution of sexually dimorphic eyes", The Journal of Experimental Biology, 209 (2006), doi:10.1242/jeb.02360.
Stavenga et al., "Classical lepidopteran wing scale colouration in the giant butterfly-moth Paysandisia archon", 2018, eerJ 6:e4590; DOI 10.7717/peerj.4590.

\* cited by examiner

VEHICLE SENSOR-CLEANING SYSTEM

BACKGROUND

Vehicles typically include sensors. The sensors can detect the external world, e.g., objects and/or characteristics of surroundings of the vehicle, such as other vehicles, road lane markings, traffic lights and/or signs, pedestrians, etc. The sensors can be radar sensors, scanning laser range finders, light detection and ranging (LIDAR) devices, and/or image processing sensors such as cameras.

The cleanliness of the sensors can affect the quality of data generated by the sensors. Cleaner sensors provide data with increased precision and accuracy. Cleaning the sensors necessitates expending resources, e.g., air or washer fluid. Vehicles can store a finite quantity of compressed air, can generate a finite quantity of energy to compress air, and can generate high-pressure air at a finite rate. Vehicles store a finite quantity of washer fluid.

DETAILED DESCRIPTION

The system described herein can reduce resources expended for cleaning sensors. The system can classify a type of obstruction on a sensor and select cleaning actions for the classified type of obstruction, which can reduce the resources expended for cleaning the sensor compared to selecting the same cleaning actions for all types of obstructions. Thus, for obstructions of less difficult types, the system expends fewer resources, in contrast to selecting the same cleaning actions for all types of obstructions, where the selected cleaning actions will likely be chosen to remove the most difficult type of obstruction, and likely will be the most resource-consumptive cleaning actions. Moreover, the present system uses at least three lamps of different ranges of wavelengths to illuminate an obstruction, providing color information for identifying the obstruction even if the sensor is a monochrome camera.

The system includes a sensor including a window; at least three lamps positioned to illuminate the window; a cleaning component positioned to clean the window; and a computer communicatively coupled to the sensor, the lamps, and the cleaning component. Each lamp is configured to generate different ranges of wavelengths than the other lamps. The computer is programmed to activate the lamps and actuate the cleaning component based on data generated by the sensor during the activations of the lamps.

Each lamp may define a direction of illumination at an acute angle with the window.

The sensor may be a camera that is one of monochrome or gray/gray/gray/red.

The window may be one of a lens or a cover positioned in front of the lens of the sensor.

The ranges of wavelengths may be nonoverlapping.

The lamps may be light-emitting diodes.

The lamps may include at least four lamps.

A computer includes a processor and a memory storing instructions executable by the processor to activate at least three lamps respectively at three different ranges of wavelengths, and actuate a cleaning component based on data generated by a sensor during the activations of the lamps. Each lamp is positioned to illuminate a window of the sensor.

The instructions may further include to identify a type of obstruction based on the data generated by the sensor during the activations of the lamps, and actuate the cleaning component based on the type of obstruction. The instructions may further include to generate a spectral reflectance curve based on the data generated by the sensor during the activations of the lamps, and identify the type of obstruction based on the spectral reflectance curve.

The instructions may further include to generate a map of surface normals based on the data generated by the sensor during the activations of the lamps, and identify the type of obstruction based on the map of surface normals.

The instructions may further include to actuate an air nozzle of the cleaning component and maintain a liquid nozzle as inactive in response to the type of obstruction being water. The instructions may further include to actuate the liquid nozzle in response to the type of obstruction being a first type, and the first type may be a type other than water.

The at least three activations may be sequential.

A method includes activating at least three lamps respectively at three different ranges of wavelengths, and actuating a cleaning component based on data generated by a sensor during the activations of the lamps. Each lamp is positioned to illuminate a window of the sensor.

The method may further include identifying a type of obstruction based on the data generated by the sensor during the activations of the lamps, and activating the cleaning component based on the type of obstruction. The method may further include generating a spectral reflectance curve based on the data generated by the sensor during the activations of the lamps, and identifying the type of obstruction based on the spectral reflectance curve.

The method may further include generating a map of surface normals based on the data generated by the sensor during the activations of the lamps, and identifying the type of obstruction based on the map of surface normals.

The at least three activations may be sequential.

A system 32 for a vehicle 30 includes a sensor 34 including a window 36; at least three lamps 38 positioned to illuminate the window 36 and able to generate different ranges of wavelengths than one another; a cleaning component 40 positioned to clean the window 36; and a computer 42 communicatively coupled to the sensor 34, the lamps 38, and the cleaning component 40. The computer 42 is programmed to activate the lamps 38 and actuate the cleaning component 40 based on data generated by the sensor 34 during the activations of the lamps 38.

Figure 1:
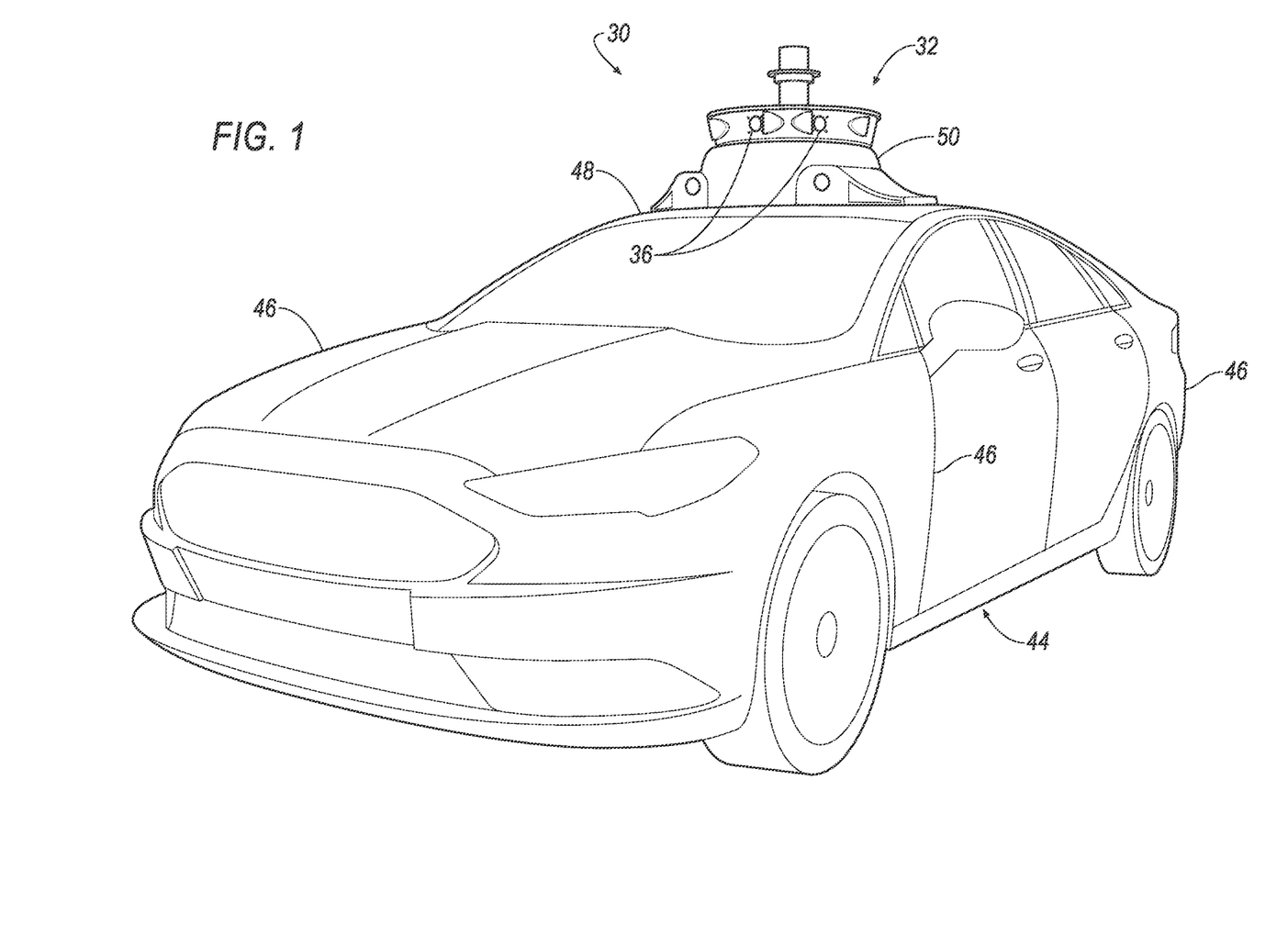
FIG. 1 is a perspective view of an example vehicle.

With reference to FIG. 1, the vehicle 30 may be any passenger or commercial automobile such as a car, a truck, a sport utility vehicle, a crossover, a van, a minivan, a taxi, a bus, a jeepney, etc.

The vehicle 30 includes a body 44. The vehicle 30 may be of a unibody construction, in which a frame and the body 44 of the vehicle 30 are a single component. The vehicle 30 may, alternatively, be of a body-on-frame construction, in which the frame supports the body 44 that is a separate component from the frame. The frame and the body 44 may be formed of any suitable material, for example, steel, aluminum, etc. The body 44 includes body panels 46, 48 partially defining an exterior of the vehicle 30. The body panels 46, 48 may present a class-A surface, e.g., a finished surface exposed to view by a customer and free of unaesthetic blemishes and defects. The body panels 46, 48 include, e.g., a roof 48, etc.

Figure 2:
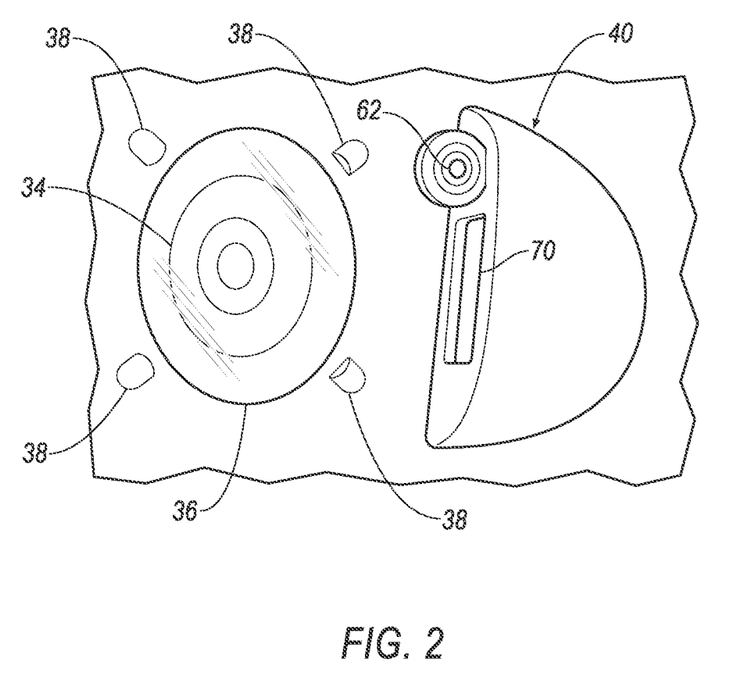
FIG. 2 is a perspective view of a sensor in a housing of the vehicle.

With reference to FIG. 2, the sensor 34 can be a camera and can detect electromagnetic radiation in some range of wavelengths. For example, the sensor 34 may detect visible light, infrared radiation, ultraviolet light, or some range of wavelengths including visible, infrared, and/or ultraviolet light. The sensor 34 may be able to differentiate a wide range of wavelengths, or the camera may be, e.g., monochrome or gray/gray/gray/red. For another example, the sensor 34 may be a time-of-flight (TOF) camera, which include a modulated light source for illuminating the environment and detect both reflected light from the modulated light source and ambient light to sense reflectivity amplitudes and distances to the scene.

The sensor 34 is mounted on the vehicle 30, directly or indirectly. For example, the sensor 34 can be mounted on one of the body panels 46, 48, e.g., the roof 48. For another example, the sensor 34 can be mounted to a housing 50, e.g., mounted inside the housing 50, and the housing 50 can be mounted on one of the body panels 46, 48, e.g., the roof 48, as shown in FIG. 1.

Figure 3A:
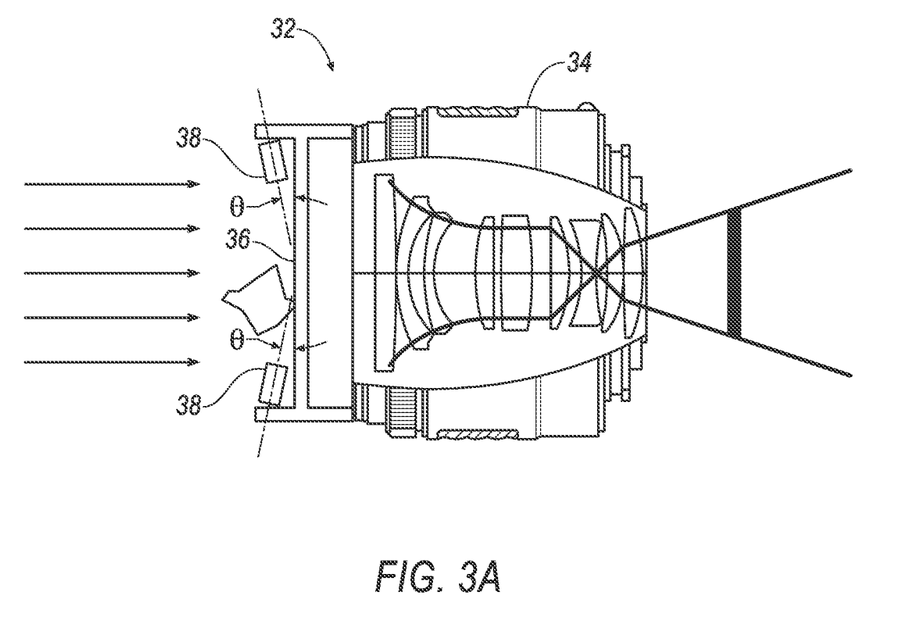
FIG. 3A is a cross-sectional view of a first example of the sensor.
Figure 3B:
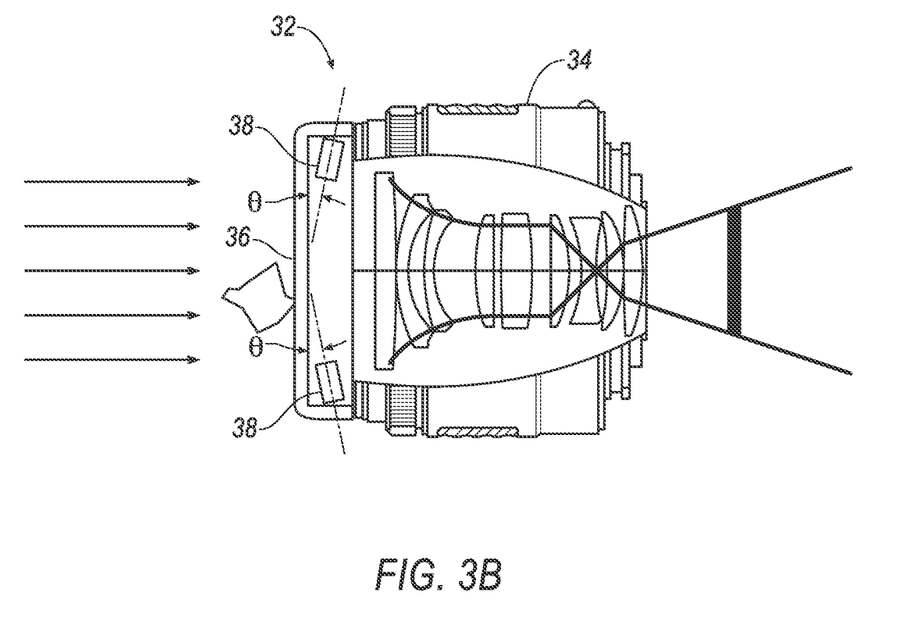
FIG. 3B is a cross-sectional view of a second example of the sensor.
Figure 3C:
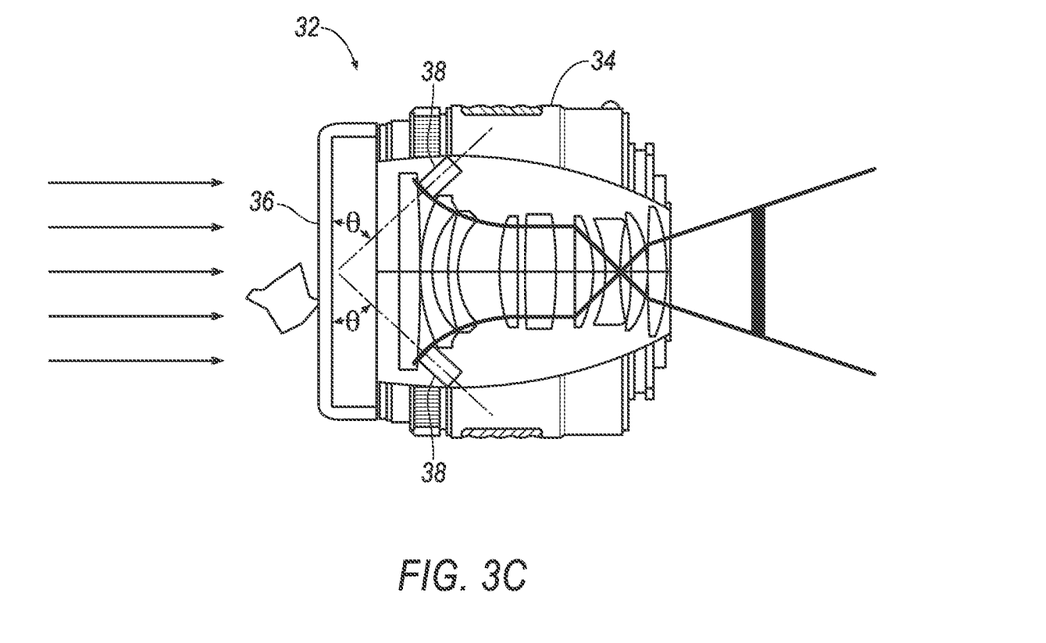
FIG. 3C is a cross-sectional view of a third example of the sensor.

With reference to FIGS. 3A-C, the sensor 34 includes the window 36. The window 36 is one of a lens or a cover positioned in front of the lens of the sensor 34. The window 36 is exposed to the ambient environment. The window 36 is transparent with respect to wavelengths detectable by the sensor 34.

The lamps 38 are positioned to illuminate the window 36. In other words, the lamps 38 when illuminated shine at the window 36. Each lamp 38 defines a direction of illumination, i.e., each lamp 38 when illuminated shines a cone of light centered around the direction of illumination, and the direction of illumination from each lamp 38 intersects the window 36. The direction of illumination from each lamp 38 intersects the window 36 at an acute angle with the window 36, e.g., an angle less than 10°.

The lamps 38 are spaced from each other around the window 36. The number of lamps 38 is at least three and may be four or five or more. A number of lamps 38 above three allows redundancy in the photometric-stereo calculations described below, which increases the robustness of the results of those calculations.

The lamps 38 may be any lighting apparatuses suitable for shining at the sensor 34, e.g., light-emitting diode (LED), tungsten, halogen, high-intensity discharge (HID) such as xenon, laser, etc. In particular, the lamps 38 can be light-emitting diodes. Each lamp 38 is configured to generate different ranges of wavelengths than the other lamps 38, and the ranges of wavelengths are nonoverlapping. In other words, the lamps 38 emit different colors than one another. For example, the lamps 38 may generate wavelengths of 400-440 nanometers (nm), 540-560 nm, 600-620 nm, and 660-700 nm, respectively.

Figure 4:
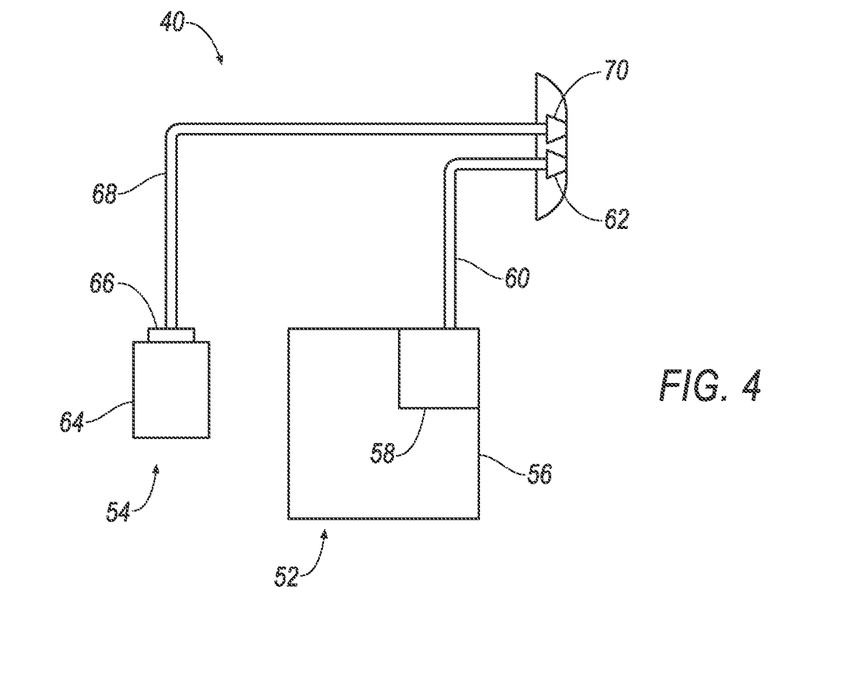
FIG. 4 is a diagram of an example cleaning system for the sensor.

With reference to FIG. 4, the cleaning component 40 is positioned to clean the window 36. The cleaning component 40 includes a liquid cleaning system 52 and an air cleaning system 54.

The liquid cleaning system 52 of the vehicle 30 includes a reservoir 56, a pump 58, liquid supply lines 60, and the liquid nozzles 62. The reservoir 56, the pump 58, and the liquid nozzles 62 are fluidly connected to each other (i.e., fluid can flow from one to the other). The liquid cleaning system 52 distributes washer fluid stored in the reservoir 56 to the liquid nozzles 62. "Washer fluid" herein refers to any liquid stored in the reservoir 56 for cleaning. The washer fluid may include solvents, detergents, diluents such as water, etc.

The reservoir 56 may be a tank fillable with liquid, e.g., washer fluid for window cleaning. The reservoir 56 may be disposed in a front of the vehicle 30, typically in an engine compartment forward of a passenger cabin. The reservoir 56 may store the washer fluid only for supplying the sensor 34 or also for other purposes, such as supply to the windshield.

The pump 58 may force the washer fluid through the liquid supply lines 60 to the liquid nozzles 62 with sufficient pressure that the washer fluid sprays from the liquid nozzles 62. The pump 58 is fluidly connected to the reservoir 56. The pump 58 may be attached to or disposed in the reservoir 56.

The liquid supply lines 60 extend from the pump 58 to the liquid nozzles 62. The liquid supply lines 60 may be, e.g., flexible tubes.

The liquid nozzles 62 receive washer fluid from the liquid supply lines 60. The liquid nozzles 62 are positioned to eject the washer fluid at the window 36. The liquid nozzles 62 are shaped to eject the washer fluid at a high pressure and speed.

The air cleaning system 54 includes a compressor 64, a filter 66, air supply lines 68, and air nozzles 70. The compressor 64, the filter 66, and the air nozzles 70 are fluidly connected to each other (i.e., fluid can flow from one to the other) in sequence through the air supply lines 68.

The compressor 64 increases the pressure of a gas by forcing additional gas from a lower-pressure region to a higher-pressure region. The compressor 64 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 66 removes solid particulates such as dust, pollen, mold, dust, and bacteria from air flowing through the filter 66. The filter 66 may be any suitable type of filter, e.g., paper, foam, cotton, stainless steel, oil bath, etc.

The air supply lines 68 extend from the compressor 64 to the filter 66 and from the filter 66 to the air nozzles 70. The air supply lines 68 may be, e.g., flexible tubes.

The air nozzles 70 receive air from the air supply lines 68. The air nozzles 70 are positioned to eject the air at the window 36. The air nozzles 70 are shaped to eject the air at a high pressure and speed.

Figure 5:
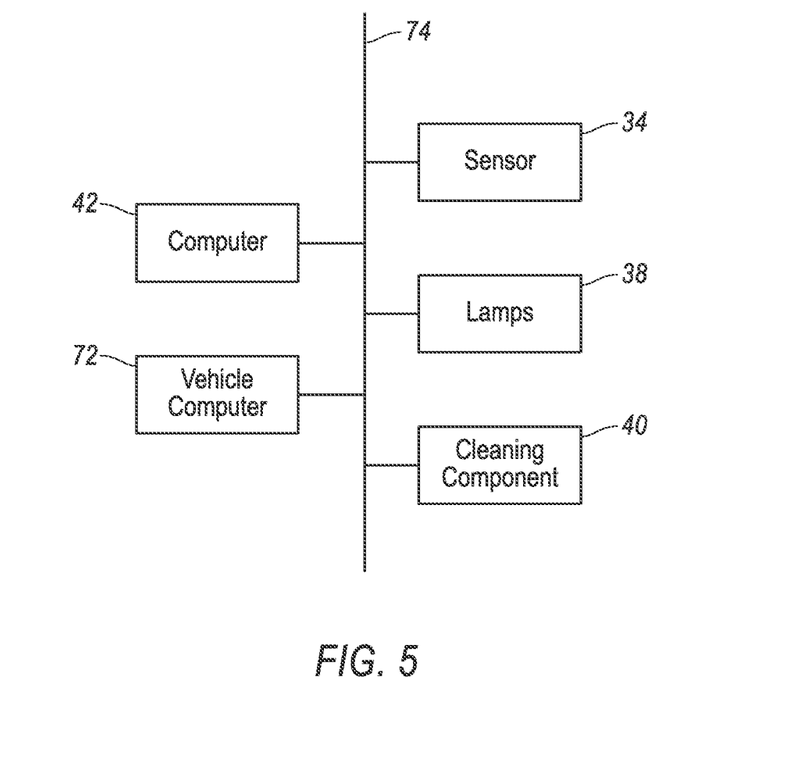
FIG. 5 is a block diagram of an example control system for the cleaning system.

With reference to FIG. 5, the vehicle 30 may be an autonomous vehicle. A vehicle computer 72 can be programmed to operate the vehicle 30 independently of the intervention of a human driver, completely or to a lesser degree. The vehicle computer 72 may be programmed to operate the propulsion, brake system, steering, and/or other vehicle systems based on data received from, e.g., the sensor 34. For the purposes of this disclosure, autonomous operation means the vehicle computer 72 controls the propulsion, brake system, and steering without input from a human driver; semi-autonomous operation means the vehicle computer 72 controls one or two of the propulsion, brake system, and steering and a human driver controls the remainder; and nonautonomous operation means a human driver controls the propulsion, brake system, and steering.

The vehicle computer 72 is a microprocessor-based computer. The vehicle computer 72 includes a processor, memory, etc. The memory of the vehicle computer 72 includes memory for storing instructions executable by the processor as well as for electronically storing data and/or databases.

The computer 42 is one or more microprocessor-based computers. The computer 42 includes memory, at least one processor, etc. The memory of the computer 42 includes memory for storing instructions executable by the processor as well as for electronically storing data and/or databases. The computer 42 may be the same computer as the vehicle computer 72, or the computer 42 may be one or more separate computers in communication with the vehicle computer 72 via a communications network 74, or the computer 42 may encompass multiple computers including the vehicle computer 72. As a separate computer, the computer 42 may be or include, e.g., one or more electronic control units or modules (ECUs or ECMs).

The computer 42 may transmit and receive data through the communications network 74, which may be a controller area network (CAN) bus, Ethernet, WiFi, Local Interconnect Network (LIN), onboard diagnostics connector (OBD-II), and/or by any other wired or wireless communications network. The computer 42 may be communicatively coupled to the vehicle computer 72, the sensor 34, the lamps 38, the cleaning component 40, and other components via the communications network 74.

Figure 6:
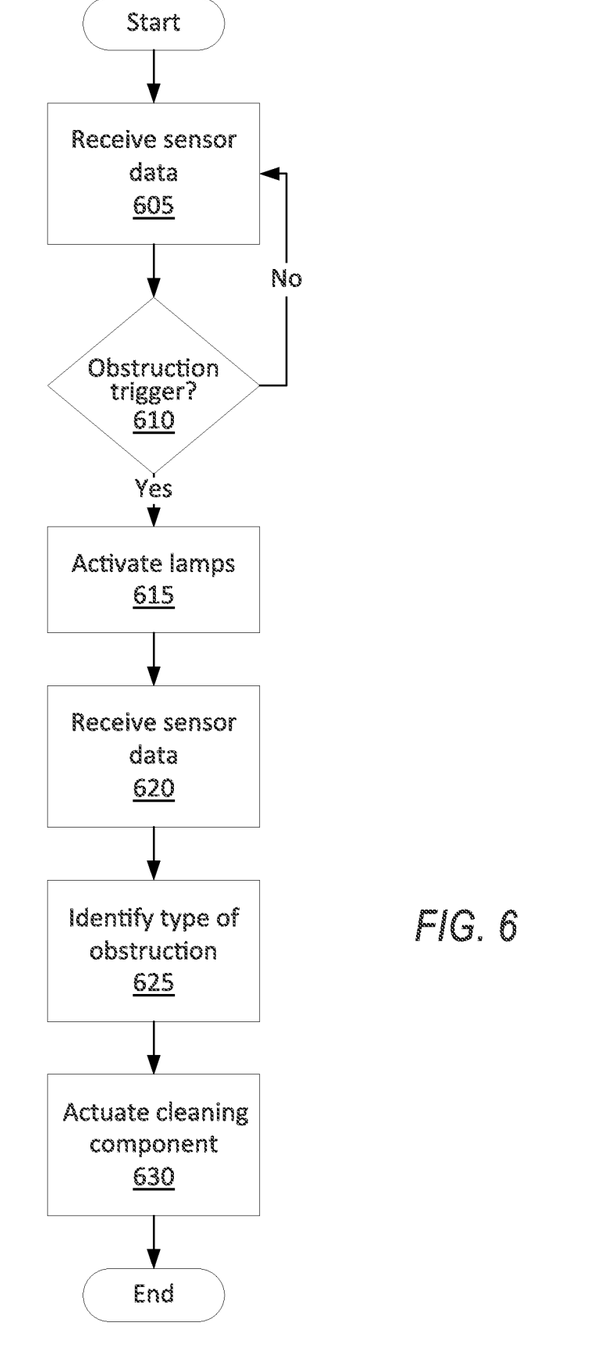
FIG. 6 is a process flow diagram of an example process for controlling the cleaning system.

FIG. 6 is a process flow diagram illustrating an exemplary process 600 for cleaning the sensor 34. The memory of the computer 42 stores executable instructions for performing the steps of the process 600. As a general overview of the process 600, once an obstruction is detected on the window 36, the computer 42 activates the lamps 38, identifies the type of obstruction based on data generated by the sensor 34 during the activations of the lamps 38, and actuates the cleaning component 40 based on the type of obstruction to clean the window 36. For the purposes of this disclosure, a "type of obstruction" is defined as a qualitative classification of something obscuring input to the sensor 34. The types of obstructions can include, e.g., water, dirt, mud, dust, crushed insect, live insect, etc.

The process 600 begins in a block 605, in which the computer 42 receives data from the sensor 34 through the communications network 74. The data are a sequence of image frames of the field of view of the sensor 34. Each image frame is a two-dimensional matrix of pixels. Each pixel has a brightness or color represented as one or more numerical values, depending on the type of sensor 34. For example, if the sensor 34 is a monochrome camera, each pixel can be a scalar unitless value of photometric light intensity between 0 (black) and 1 (white). For another example, if the sensor 34 is a full-color camera, the pixels can be values for each of red, green, and blue, e.g., each on an 8-bit scale (0 to 255) or a 12- or 16-bit scale. For another example, if the sensor 34 is a gray/gray/gray/red camera, the pixels can be a repeating pattern of scalar values of intensity for three pixels and a fourth pixel of a quantity of the color red. Position in an image frame, i.e., position in the field of view of the sensor 34 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the sensor 34 can be event-based vision, in which each pixel records independently of the other pixels when that pixel senses motion, thus recording more extensively about portions of the field of view experiencing change and recording less about portions of the field of view remaining static.

Next, in a decision block 610, the computer 42 determines whether an obstruction trigger has occurred. An "obstruction trigger" is any data received in the computer 42 that indicates that the window 36 should be cleaned. For example, the computer 42 may receive a user command to perform cleaning of the window 36 or of another component of the vehicle 30 such as a windshield. For another example, the computer 42 may determine that debris is on the window 36 based on data received from the sensor 34. For example, the computer 42 may determine, e.g., according to known image-analysis techniques, that a set of pixels in image data received from the sensor 34 is unchanging over time compared to the other of the pixels in the image data, suggesting that a portion of the field of view of the sensor 34 has been covered. Other algorithms may be used, e.g., classical computer vision or machine learning algorithms such as convolutional neural networks. In response to the lack of an obstruction trigger, the process 600 returns to the block 605 to continue monitoring for obstructions. In response to an obstruction trigger, the process 600 proceeds to a block 615.

In the block 615, the computer 42 activates the lamps 38 respectively at different ranges of wavelengths. The lamps 38 number at least three and have different ranges of wavelengths than one another. The activations of the lamps 38 can be simultaneous or sequential. The computer 42 activates the lamps 38 simultaneously if the sensor 34 is a full-color camera. The computer 42 activates the lamps 38 sequentially if the sensor 34 is a monochrome or gray/gray/gray/red camera.

Next, in a block 620, the computer 42 receives data generated by the sensor 34 during the activations of the lamps 38. For example, the data can be image data of a single image while all the lamps 38 are activated if the sensor 34 is a full-color camera. For another example, the data can be image data of multiple images each taken while one of the lamps 38 is activated if the sensor 34 is a monochrome or gray/gray/gray/red camera.

Next, in the block 625, the computer 42 identifies the type of obstruction based on the data received in the block 620. The computer 42 can identify the type of obstruction using conventional image-recognition techniques, e.g., a convolutional neural network programmed to accept images as input and output an identified type of obstruction. The types of obstructions can include, e.g., water, dirt, mud, dust, crushed insect, live insect, etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. As intermediate or further steps in identifying the type of obstruction, the computer 42 can generate and then use a spectral reflectance curve and/or a map of surface normals, as described in detail below. For example, the spectral reflectance curve and/or the map of surface normals can be layers in the convolutional neural network. Using the spectral reflectance curve and/or the map of surface normals can provide additional information for more accurate classifications than conventional image recognition, and can help the classification occur in situations difficult for conventional image recognition, such as low-light conditions or an out-of-focus object. The final layer of the convolutional neural network generates a score for each potential type of obstruction, and the final output is the type of obstruction with the highest score.

Figure 7:
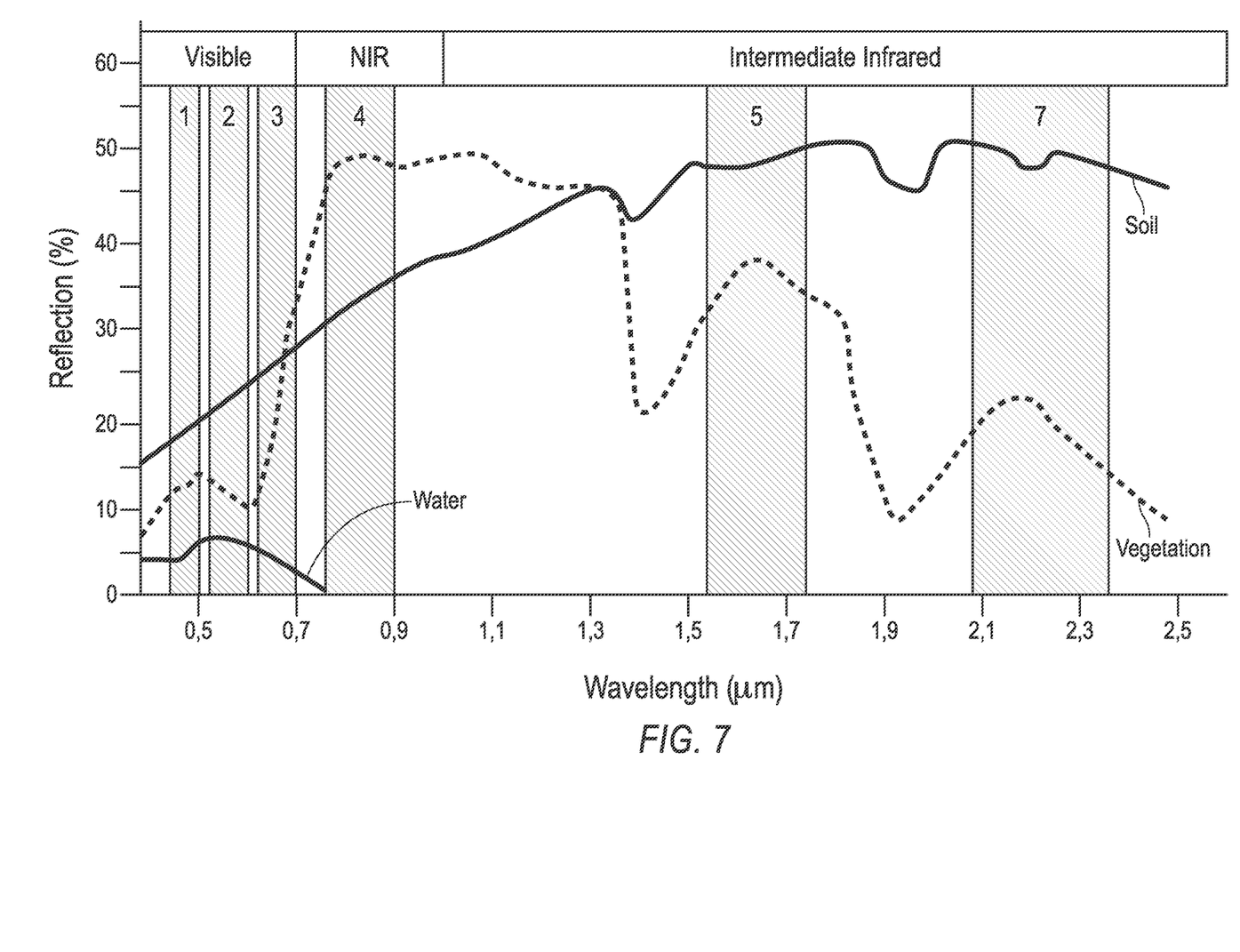
FIG. 7 is a plot of example spectral reflectance curves.

A spectral reflectance curve is a relationship of reflectivity, e.g., reflection percentage, intensity, etc. versus wavelength. The computer 42 generates the spectral reflectance curve based on the data generated by the sensor 34 during the activations of the lamps 38. FIG. 7 shows spectral reflectance curves for three types of obstructions. For example, water has a low reflection percentage for visible light and zero for near infrared and intermediate infrared. Because the lamps 38 produce different ranges of wavelengths, a spectral reflectance curve can be constructed from the data even if the sensor 34 is a monochrome or gray/gray/gray/red camera. The output of generating the spectral reflectance curve can be, e.g., a plurality of reflectivities at a corresponding plurality of wavelengths.

A map of surface normals is a map of vectors normal to a surface of an object viewed by the sensor 34. Each vector is a three-dimensional spatial vector normal, i.e., orthogonal or perpendicular, to a small portion of a surface of an object in the environment, and the vectors thereby define the orientation of the surfaces. The vectors may be unit vectors that are unitless. The vectors are mapped to a position in an image of the field of view of the sensor 34. The computer 42 generates the map of surface normals based on the data generated by the sensor 34 during the activations of the lamps 38. The computer 42 uses photometric stereo techniques to generate the map of surface normals, as is known. Photometric-stereo techniques require images of an object, in this case, the obstruction, under different lighting conditions. The different lighting conditions are supplied by the different directions of illumination produced by the lamps 38. Either the sequential images from the sequential activations of the lamps 38 are used, or multiple images are generated from an image from the simultaneous activations of the lamps 38, with each of the multiple images of just a range of wavelengths from one of the lamps 38.

After the block 625, the block 630 is executed. In the block 630, the computer 42 actuates the cleaning component 40 based on the type of obstruction. The memory of the computer 42 can store a lookup table of how to actuate the cleaning component 40 paired with types of obstructions, e.g., the following table:

| Type of Obstruction | Liquid cleaning system 52 | Air cleaning system 54 |
|---|---|---|
| Water | Inactive | Actuate at high level until removed |
| Dirt | Actuate until removed | Actuate after 1 s delay |
| Mud | Actuate until removed | Actuate simultaneously |
| Dust | Actuate for preset time | Actuate after preset time |
| Crushed insect | Actuate until removed | Actuate simultaneously |
| Live insect | Inactive | Actuate at high level in bursts |

For example, as shown in the table, the computer 42 actuates the air nozzles 70 of the air cleaning system 54 and maintains the liquid nozzles 62 of the liquid cleaning system 52 as inactive in response to the type of obstruction being water. For another example, as shown in the table, for types of obstruction other than water such as dirt, mud, dust, and crushed insect, the computer 42 actuates the liquid nozzles 62 in addition to the air nozzles 70. After the block 630, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a sensor including a window;
   at least three lamps positioned to illuminate the window, each lamp configured to generate different ranges of wavelengths than the other lamps;
   a cleaning component positioned to clean the window; and
   a computer communicatively coupled to the sensor, the lamps, and the cleaning component;
   wherein the computer is programmed to:
      activate the lamps to generate respective colors at the different ranges of wavelengths in a preset sequence;
      identify a type of obstruction based on data indicating the colors that are generated by the sensor during the preset sequence of activations of the lamps; and
      actuate the cleaning component based on the type of obstruction.

2. The system of claim 1, wherein each lamp defines a direction of illumination at an acute angle with the window.

3. The system of claim 1, wherein the sensor is a camera that is one of monochrome or gray/gray/gray/red.

4. The system of claim 1, wherein the window is one of a lens or a cover positioned in front of the lens of the sensor.

5. The system of claim 1, wherein the ranges of wavelengths are nonoverlapping.

6. The system of claim 1, wherein the lamps are light-emitting diodes.

7. The system of claim 1, wherein the lamps include at least four lamps.

8. The system of claim 1, wherein the computer is further programmed to generate a spectral reflectance curve based on the data indicating the colors that are generated by the sensor during the preset sequence of activations of the lamps, and the programming to identify the type of obstruction includes programming to identify the type of obstruction based on the spectral reflectance curve.

9. The system of claim 1, wherein the computer is further programmed to generate a map of surface normals based on the data generated by the sensor during the preset sequence of activations of the lamps, and the programming to identify the type of obstruction includes programming to identify the type of obstruction based on the map of surface normals.

10. A computer comprising a processor and a memory storing instructions executable by the processor to:
    activate at least three lamps respectively to generate respective colors at three different ranges of wavelengths in a preset sequence, each lamp positioned to illuminate a window of a sensor;
    identify a type of obstruction based on data indicating the colors that are generated by the sensor during the preset sequence of activations of the lamps; and
    actuate a cleaning component based on the type of obstruction.

11. The computer of claim 10, wherein the instructions further include instructions to generate a spectral reflectance curve based on the data indicating the colors that are generated by the sensor during the preset sequence of activations of the lamps, and the instructions to identify the type of obstruction include instructions to identify the type of obstruction based on the spectral reflectance curve.

12. The computer of claim 10, wherein the instructions further include instructions to generate a map of surface normals based on the data generated by the sensor during the preset sequence of activations of the lamps, and the instructions to identify the type of obstruction include instructions to identify the type of obstruction based on the map of surface normals.

13. The computer of claim 10, wherein the instructions further include instructions to actuate an air nozzle of the cleaning component and maintain a liquid nozzle as inactive in response to the type of obstruction being water.

14. The computer of claim 13, wherein the instructions further include instructions to actuate the liquid nozzle in response to the type of obstruction being a first type, and the first type is a type other than water.

15. The computer of claim 10, wherein the preset sequence of at least three activations is sequential.

16. A method comprising:
   activating at least three lamps respectively to generate respective colors at three different ranges of wavelengths in a preset sequence, each lamp positioned to illuminate a window of a sensor;
   identifying a type of obstruction based on data indicating the colors that are generated by the sensor during the preset sequence of activations of the lamps; and
   actuating a cleaning component based on the type of obstruction.

17. The method of claim 16, further comprising generating a spectral reflectance curve based on the data indicating the colors that are generated by the sensor during the preset sequence of activations of the lamps, wherein identifying the type of obstruction includes identifying the type of obstruction based on the spectral reflectance curve.

18. The method of claim 16, further comprising generating a map of surface normals based on the data generated by the sensor during the preset sequence of activations of the lamps, wherein identifying the type of obstruction includes identifying the type of obstruction based on the map of surface normals.

19. The method of claim 16, wherein the preset sequence of at least three activations is sequential.

* * * * *